United States Patent
Lin et al.

(10) Patent No.: US 8,960,920 B2
(45) Date of Patent: *Feb. 24, 2015

(54) PROJECTION APPARATUS

(71) Applicant: Qisda Corporation, Taoyuan County (TW)

(72) Inventors: Ming-Kuen Lin, Yunlin County (TW); Tsung-Hsun Wu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 181 days.

This patent is subject to a terminal disclaimer.

(21) Appl. No.: 13/633,885

(22) Filed: Oct. 3, 2012

(65) Prior Publication Data
US 2013/0088691 A1 Apr. 11, 2013

(30) Foreign Application Priority Data
Oct. 7, 2011 (TW) .............................. 100136584 A

(51) Int. Cl.
| G03B 21/14 | (2006.01) |
| G03B 21/20 | (2006.01) |
| G03B 21/28 | (2006.01) |
| H04N 9/31 | (2006.01) |
| G02B 13/16 | (2006.01) |
| G02B 27/12 | (2006.01) |
| G02B 5/04 | (2006.01) |

(52) U.S. Cl.
CPC ................ G03B 21/20 (2013.01); G03B 21/28 (2013.01); H04N 9/3111 (2013.01); H04N 9/315 (2013.01); G02B 13/16 (2013.01); G02B 27/126 (2013.01); G02B 5/04 (2013.01)
USPC ........................................................... 353/38

(58) Field of Classification Search
CPC . H04N 9/3197; H04N 9/3105; H04N 9/3167; H04N 5/7441; G02B 27/123; G02B 27/283; G02B 27/0961; G03B 21/2033; G03B 21/14
USPC ....................... 353/30, 33, 37, 38, 97, 98, 99; 359/485.04, 485.06, 489.07, 618, 619, 359/639, 640; 348/744–747, 749, 761; 349/5, 7–9
See application file for complete search history.

(56) References Cited

U.S. PATENT DOCUMENTS

| 6,325,514 | B1 * | 12/2001 | Yamamoto | 353/31 |
| 6,646,806 | B1 * | 11/2003 | Bierhuizen | 359/618 |
| 7,905,631 | B2 * | 3/2011 | Chen et al. | 362/284 |
| 2005/0041215 | A1 * | 2/2005 | Fujimori | 353/38 |
| 2011/0128503 | A1 * | 6/2011 | Sawai et al. | 353/8 |
| 2012/0133898 | A1 * | 5/2012 | Chang et al. | 353/31 |

FOREIGN PATENT DOCUMENTS

| TW | 200714058 | 4/2007 |
| TW | M403676 | 5/2011 |

* cited by examiner

*Primary Examiner* — Sultan Chowdhury

(57) ABSTRACT

The present invention provides a projection apparatus including a light source module, an illumination lens module, a light valve, and a projection lens. The light source module is configured to provide a first light beam, and the illumination lens module and the light valve are disposed on a first propagating path of the first light beam. The illumination lens module has a first optic axis. The light valve is configured to transfer the first light beam into a second light beam with an image, and the first light beam propagates through the illumination lens module to the light valve without reflection. The projection lens has a second optic axis substantially perpendicular to the first optic axis.

7 Claims, 2 Drawing Sheets

PROJECTION APPARATUS

BACKGROUND OF THE INVENTION

1. Field of the Invention

The present invention relates to a projection apparatus, and more particularly, to a projection apparatus with a single light valve.

2. Description of the Prior Art

With the progress of science and technology, projection apparatuses gradually play an important role in use of family, entertainment or business. Recently, requirements of large size flat displays greatly grow up, and desires of consumers for image size and image quality are becoming stricter and stricter. The related projection technology is accordingly advanced. The technology of the projection apparatus is to project an image onto a screen through an optical projection method and to enlarge the image size through an optical method. Accordingly, the bottleneck in the size of the flat display could be broken, and the main body of the projection apparatus could become thinner and lighter.

The projection apparatus according to the prior art is composed of a light engine system, a light valve, and a projection lens. The light valve has a plurality of pixel units, and the light engine system could be composed of a light source and an illumination lens module. A light beam generated from the light source could be projected onto the light valve through the illumination lens module, and be transferred to have an image signal through the light valve. After that, the light beam with image could be projected onto a screen by the projection lens, and the image could be displayed.

However, based on the consideration of maximizing the energy of the light beam, reducing interference between light beam and optimizing the image quality, the illumination lens module configured to project the light beam from the light source on the light valve has a lot of lenses and a specific light path length, so that the size of the projection apparatus is limited in miniaturization. Although the light engine system has been developed to include a reflective mirror disposed therein to reduce the size of the projection apparatus through folding the light path, the reflective mirror is disposed off the optic axis. Thus, the whole projection apparatus has larger unsteadiness, and the reflective mirror increases manufacturing difficulty due to its large size. This method of placing the reflective mirror is not easily accepted by the market.

Therefore, with the development of the projection apparatus toward lightness and thinness, to provide a projection apparatus having an illumination lens module with no reflective mirror is an objective in this field.

SUMMARY OF THE INVENTION

It is therefore an objective of the present invention to provide a projection apparatus to solve the above-mentioned problem of the increase of the manufacturing cost and manufacturing difficulty.

According to an embodiment of the present invention, a projection apparatus is provided. The projection apparatus includes a light source module, an illumination lens module, a light valve, and a projection lens. The light source module is configured to provide a first light beam. The illumination lens module is disposed on a first propagating path of the first light beam, and the illumination lens module has a first optic axis. The light valve is disposed on the first propagating path of the first light beam, and is configured to transfer the first light beam into a second light beam with an image, wherein the first light beam propagates through the illumination lens module to the light valve without reflection. The projection lens is disposed on a second propagating path of the second light beam, and configured to project the image onto a screen, wherein the projection lens has a second optic axis, and the second optic axis is substantially perpendicular to the first optic axis.

In the present invention, the first optic axis of the illumination lens module is substantially perpendicular to the second optic axis of the projection lens, so that the size of the projection apparatus along the Y axis can be reduced. Furthermore, the illumination lens module has no reflective mirror, so that the first light beam penetrates through the illumination lens module without reflection and is transferred to the light valve. Thus, larger instability of the illumination lens module and difficulty in manufacturing the illumination lens module resulted from the reflective mirror can be avoided.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the present invention, embodiments will be detailed as follows. The embodiments of the present invention are illustrated in the accompanying drawings with numbered elements to elaborate the contents and effects to be achieved.

Figure 1:
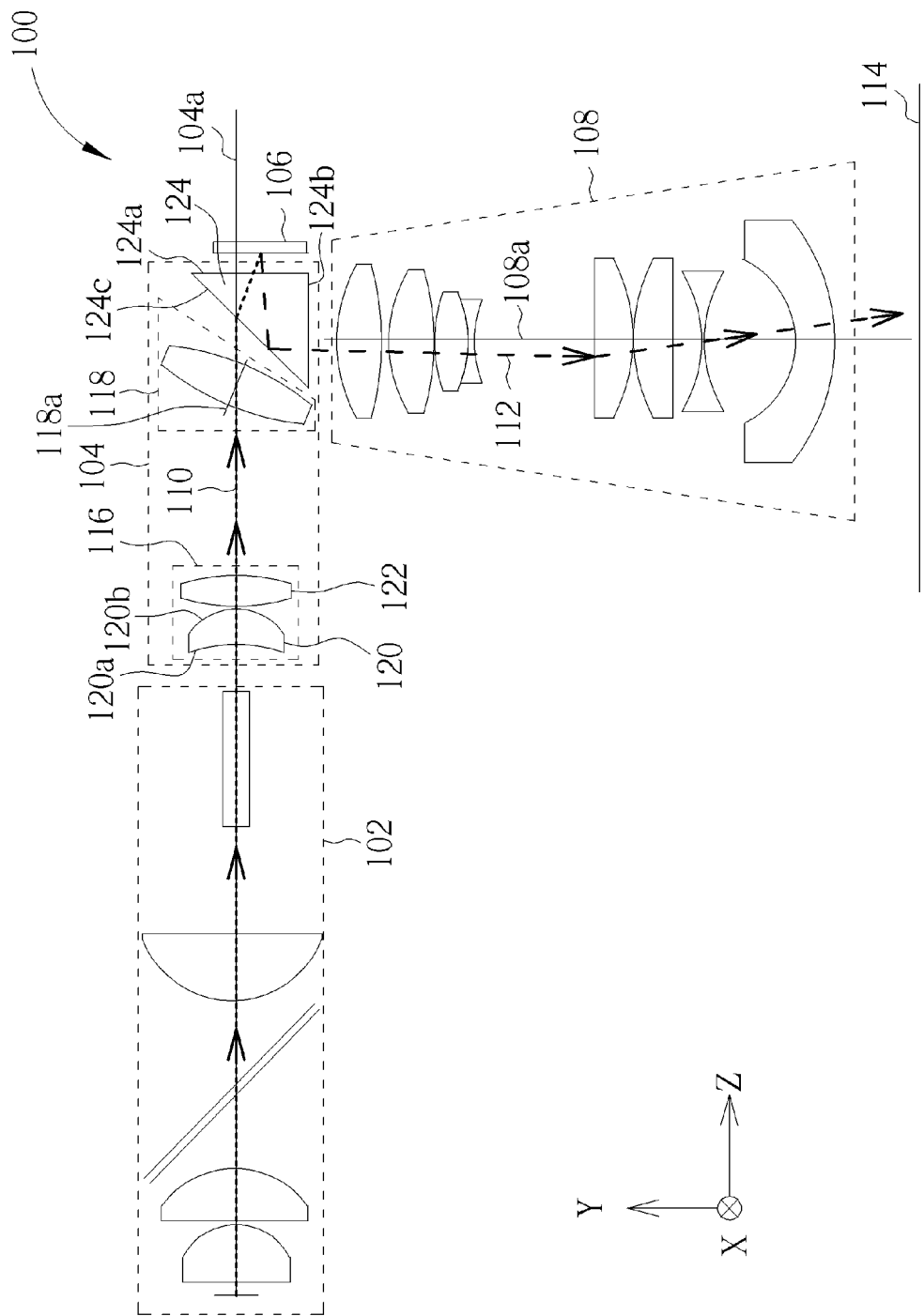
FIG. 1 is a schematic diagram illustrating a top view of a projection apparatus according to a first embodiment of the present invention.

Refer to FIG. 1, which is a schematic diagram illustrating a top view of a projection apparatus according to a first embodiment of the present invention. As shown in FIG. 1, the projection apparatus 100 is disposed in a three dimension space defined by an X axis, a Y axis, and a Z axis, and the X axis, the Y axis, and the Z axis are perpendicular to one another. The projection apparatus 100 includes a light source module 102, an illumination lens module 104, a light valve 106, and a projection lens 108. The light source module 102 is configured to provide a first light beam 110, and the illumination lens module 104 and the light valve 106 are disposed on a first propagating path (e.g., +Z axis direction) of the first light beam 110. The illumination lens module 104 is disposed on the first propagating path of the first light beam 110 and between the light valve 106 and the light source module 102, and is configured to project the first light beam 110 to the light valve 106. In addition, the light valve 106 is configured to transfer the first light beam 110 into a second light beam 112 with an image. Further, the projection lens 108 is disposed on a second propagating path (e.g., −Y axis direction) of the second light beam 112, and is configured to project the second light beam 112 with the image onto a screen 114. In this embodiment, the illumination lens module 104 has a first optic axis 104a disposed parallel with the Z axis, and the projection lens 108 has a second optic axis 108a disposed parallel with the Y axis. Since the first optic axis 104a is substantially perpendicular to the second optic axis 108a, the projection apparatus 100 of this embodiment has a length along the Y axis which is determined majorly by a length of the projection lens 108. Besides, a size of the projection apparatus 100 along the Y axis can be effectively reduced by adjusting an optical condition of the illumination lens module 104. Furthermore, the light source module 102 could generate the first light beam with different colors by utilizing a plurality of light-emitting diodes with different colors or a light bulb together with a color wheel, but the present invention is not limited herein. The light valve 106 is disposed on a plane formed by the X axis and the Y axis, and could be a reflective display panel or a digital micro-mirror device (DMD). Moreover, the light valve 106 has a plurality of pixel units configured to reflect a part of the first light beam 110 respectively, so that the reflective light becomes the second light beam 112 with the image.

In addition, the illumination lens module 104 includes a first lens group 116, and a second lens group 118. The first lens group 116 is disposed on the first propagating path of the first light beam 110 and placed between the light source module 102 and the light valve 106. The first lens group 116 has a first effective focal length. The second lens group 118 is disposed on the first propagating path of the first light beam 110 and placed between the first lens group 116 and the light valve 106. The second lens group 118 has a second effective focal length. In this embodiment, a distance between the light source module 102 and the first lens group 116 is less than the first effective focal length, so that a virtual image formed at a left side of the first lens group 116 could be shown after the first light beam 110 penetrating the first lens group 116. Also, an interval between the first lens group 116 and the second lens group 118 is greater than two times the first effective focal length, and is between one time and 1.4 times the second focal length, so that the length of the illumination lens module 104 along the Z axis could be effectively reduced, and the size of the projection apparatus 100 could be further reduced. Furthermore, the virtual image can be projected to be a real image formed at a right side of the second lens group 118 through the second lens group 118, and a distance between the real image and the second lens group 118 is less than the second effective focal length. Accordingly, the size of the real image is substantially the same as a distribution area of the pixel units of the light valve 106. Thus, most part of the first light beam 110 could be effectively utilized to display the image so as to display the image with largest brightness. The present invention is not limited herein, and the area of first light beam 110 illuminated on the light valve 106 also can be larger than the distribution area of the pixel units of the light valve 106. It should be noted that the illumination lens module 104 has no reflective mirror, so that the first light beam 110 could penetrate through the illumination lens module 104 without reflection to the light valve 106. For this reason, larger instability of the illumination lens module 104 and difficulty in manufacturing the illumination lens module 104 resulted from the reflective mirror can be avoided in this embodiment.

Furthermore, the first lens group 116 of this embodiment is composed of a concave-convex lens 120 and a double convex lens 122, and the double convex lens 122 is disposed between the concave-convex lens 120 and the second lens group 118. A concave surface 120a of the concave-convex lens 120 disposed opposite to the light source module 102, and a convex surface 120b of the concave-convex lens 120 is disposed opposite to the second lens group 118. The first lens group 116 is not limited to this, and also could be composed of a single lens. In addition, the second lens group 118 in this embodiment is composed of a single double convex lens, and a third optic axis 118a of the second lens group 118 deviates from the first optic axis 110 so as to adjust an incident angle of the first light beam 110 to the light valve 106. Thus, an exiting angle of the second light beam 112 out of the light valve 106 could be modified. Accordingly, the first light beam 110 could be substantially perpendicular to the second light beam 112. The second lens group of the present invention is not limited to be composed of only one lens, and also could be composed of a plurality of lenses.

In this embodiment, the illumination lens module 104 further includes at least one prism 124 disposed on the first propagating path of the first light beam 110 and between the second lens group 118 and the light valve 106. The illumination lens module 104 of this embodiment is a telecentric structure, but is not limited to this. In addition, the prism 124 has a first lens surface 124a, a second lens surface 124b, and a third lens surface 124c. The first lens surface 124a is disposed parallel with a plane formed by the X axis and the Y axis, and the second lens surface 124b is disposed parallel with a plane formed by the X axis and the Z axis. An included angle between the third lens surface 124c and the first lens surface 124a and an included angle between the third lens surface 124c and the second lens surface are respectively 45 degrees, and the third lens surface 124c is disposed between the first lens surface 124a and the second lens group 118, so that the prism 124 is a right-angle prism. After the first light beam 110 penetrates through the second lens group 118, the first light beam 110 passes through the third lens surface 124c and the first lens surface 124a in sequence, and then, reaches the light valve 106. Afterward, the second light beam 112 passes through the first lens surface 124a first after being emitted from the light valve 106. Then, the second light beam 112 is totally reflected by the third lens surface 124c, and is projected to the projection lens 108 after passing through the second lens surface 124b. The included angles between the third lens surface and the first lens surface and between the third lens surface and the second lens surface of the prism in the present invention are not limited to be 45 degrees, and the prism of the present invention is not limited to the right-angle prism. The included angles between the third lens surface and the first lens surface and between the third lens surface and the second lens surface also could be other degrees, and the prism could be other kinds of prisms.

Also, since the third optic axis 118a of the second lens group 118 deviates from the first optic axis and inclines toward the third lens surface 124c of the prism 124, the second lens group 118 could partially overlap the prism 124. Accordingly, a distance between the illumination lens module 104 and the light valve 106 could be further shortened, and the size of the projection apparatus 100 along the Z axis can be reduced. Furthermore, the prism 124 has a refractive index between 1.5 and 1.61. Hence, a total reflection angle of the third lens surface 124c of the prism reflecting the second light beam 112 won't be too small, and the second light beam 112 could be avoided from having dispersion resulted from over large optical path difference being generated during passing through the prism 124.

The projection apparatus of the present invention is not limited to the above-mentioned embodiment. The following description continues to detail the other embodiments or modifications, and in order to simplify and show the difference between the other embodiments or modifications and the above-mentioned embodiment, the same numerals denote the same components in the following description, and the same parts are not detailed redundantly.

Figure 2:
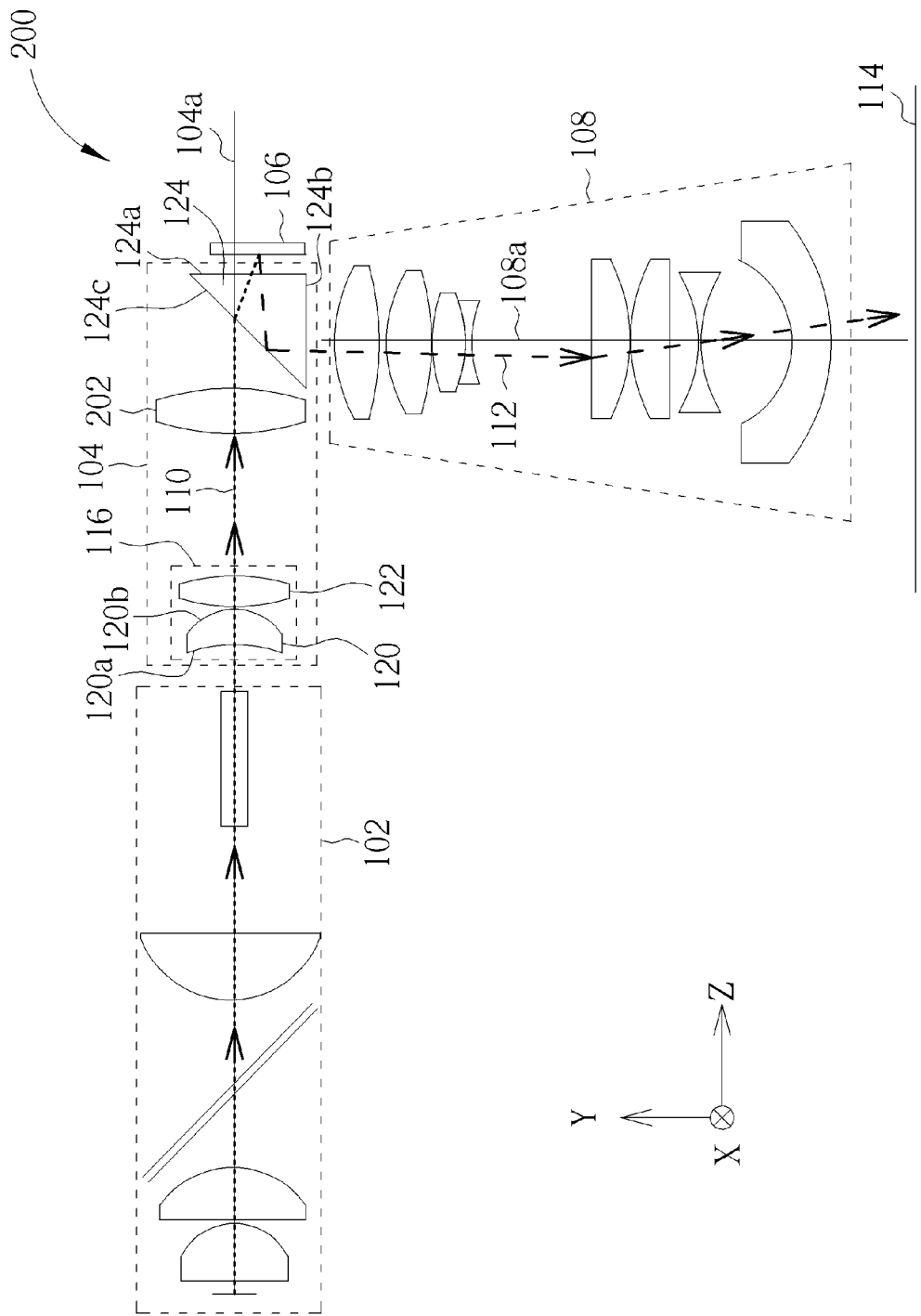
FIG. 2 is a schematic diagram illustrating a top view of a projection apparatus according to a second embodiment of the present invention.

Refer to FIG. 2, which is a schematic diagram illustrating a top view of a projection apparatus according to a second embodiment of the present invention. As shown in FIG. 2, as compared with the first embodiment, the second lens group 202 of the projection apparatus 200 in this embodiment has the third optic axis coaxial with the first optic axis 104a, and the second lens group 202 doesn't overlap the prism 124.

In summary, the first optic axis of the illumination lens module is substantially perpendicular to the second optic axis of the projection lens, so that the size of the projection apparatus along the Y axis could be reduced. Furthermore, the illumination lens module has no reflective mirror, so that larger instability of the illumination lens module and difficulty in manufacturing the illumination lens module resulted from the reflective mirror could be avoided. Besides, an interval between the first lens group and the second group is greater than two times the first effective focal length and between one time and 1.4 times the second effective focal length. Accordingly, the length of the illumination lens module along the Z axis could be decreased, and the size of the projection apparatus along the Z axis could be shortened. Moreover, the third optic axis of the second lens group deviates from the first optic axis, so that the size of the projection apparatus along the Z axis could be further reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projection apparatus, comprising:
   a light source module, configured to provide a first light beam;
   an illumination lens module, disposed on a first propagating path of the first light beam, and the illumination lens module having a first optic axis, the illumination lens module comprising:
      a first lens group, disposed on the first propagating path of the first light beam, and the first lens group having a first effective focal length; and
      a second lens group, disposed on the first propagating path of the first light beam, and the second lens group having a second effective focal length, wherein an interval between the first lens group and the second lens group is greater than two times the first effective focal length, and the interval is between one time and 1.4 times the second focal length;
   a light valve, disposed on the first propagating path of the first light beam, and configured to transfer the first light beam into a second light beam with an image, wherein the first light beam propagates through the illumination lens module to the light valve without reflection, the first lens group is disposed between the light source module and the light valve, and the second lens group is disposed between the first lens group and the light valve; and
   a projection lens, disposed on a second propagating path of the second light beam, and configured to project the image onto a screen, wherein the projection lens has a second optic axis, and the second optic axis is substantially perpendicular to the first optic axis.

2. The projection apparatus according to claim 1, wherein the illumination lens module further comprises a prism, disposed on the first propagating path of the first light beam and between the second lens group and the light valve.

3. The projection apparatus according to claim 2, wherein the prism is a right-angle prism.

4. The projection apparatus according to claim 2, wherein a refractive index of the prism is between 1.5 and 1.61.

5. The projection apparatus according to claim 1, wherein the second lens group is composed of a single lens.

6. The projection apparatus according to claim 1, wherein a third optic axis of the second lens group deviates from the first optic axis.

7. The projection apparatus according to claim 1, wherein the illumination lens module has no reflective mirror.

* * * * *